United States Patent
Rolle et al.

(10) Patent No.: US 9,947,219 B2
(45) Date of Patent: Apr. 17, 2018

(54) MONITORING OF A TRAFFIC SYSTEM

(71) Applicant: Urban Software Institute GmbH, Chemnitz (DE)

(72) Inventors: Oliver Rolle, Hochheim am Main (DE); Christian Mueller, Wiesbaden Rambach (DE); Fernando Lyardet, Frankfurt (DE)

(73) Assignee: Urban Software Institute GmbH, Chemnitz (DE)

( * ) Notice: Subject to any disclaimer, the term of this patent is extended or adjusted under 35 U.S.C. 154(b) by 21 days.

(21) Appl. No.: 15/270,976

(22) Filed: Sep. 20, 2016

(65) Prior Publication Data
US 2017/0084172 A1 Mar. 23, 2017

(30) Foreign Application Priority Data
Sep. 21, 2015 (EP) .................................... 15186008

(51) Int. Cl.
G08G 1/095 (2006.01)
G06K 9/62 (2006.01)
(Continued)

(52) U.S. Cl.
CPC .......... *G08G 1/095* (2013.01); *G06K 9/00825* (2013.01); *G06K 9/6256* (2013.01);
(Continued)

(58) Field of Classification Search
CPC ....... G08G 1/096716; G08G 1/096725; G08G 1/00; G08G 1/01; G08G 1/0104;
(Continued)

(56) References Cited

U.S. PATENT DOCUMENTS 6,989,766 B2 * 1/2006 Mese ............... G08G 1/096716
340/907
8,819,313 B1 * 8/2014 Walther ................. G08G 1/097
709/208
(Continued)

FOREIGN PATENT DOCUMENTS

DE 102012108863 A1 5/2014
DE 102014003781 A1 9/2015

OTHER PUBLICATIONS

European Search Report for EP Application No. 15186008.7 dated Mar. 15, 2016, 4 pages.
(Continued)

*Primary Examiner* — Michael Osinski
(74) *Attorney, Agent, or Firm* — Brake Hughes Bellermann LLP

(57) ABSTRACT

A traffic control system can includes a plurality of traffic lights. A monitoring system can include an inbound interface component, an analytics component, and an outbound status provisioning component. The inbound interface component can be configured to receive a stream of sensor data from visual sensor(s). Each visual sensor can be configured to capture light signals of traffic lights. Each traffic light can be sensed by the visual sensor(s). The received stream of sensor data can represent a current signal status of each traffic light. The analytics component can be configured to predict at least one future signal status for each of the traffic lights based on the use of a machine learning algorithm. The outbound status provisioning component can be configured to send a message(s) to a vehicle. The sent message can influence the operation of the vehicle.

20 Claims, 8 Drawing Sheets

(51) Int. Cl.
  *G06K 9/00* (2006.01)
  *G08G 1/0967* (2006.01)
  *G06N 5/04* (2006.01)
  *G06N 99/00* (2010.01)

(52) U.S. Cl.
  CPC ............. *G06N 5/04* (2013.01); *G06N 99/005* (2013.01); *G08G 1/096716* (2013.01); *G08G 1/096725* (2013.01); *G08G 1/096758* (2013.01); *G08G 1/096783* (2013.01)

(58) Field of Classification Search
  CPC .. G08G 1/0108; G08G 1/0116; G08G 1/0145; G08G 1/096766; G08G 1/096783; G08G 1/052; G08G 1/0133; G08G 1/095; G08G 1/0967; G08G 1/096708; G06K 9/00825; G06K 9/6256; G06N 99/005
  See application file for complete search history.

(56) References Cited

U.S. PATENT DOCUMENTS

| | | | | |
|---|---|---|---|---|
| 8,878,695 | B2* | 11/2014 | Cross | G08G 1/082 340/901 |
| 8,972,145 | B2 | 3/2015 | Mahler et al. | |
| 9,207,091 | B2* | 12/2015 | Ota | G08G 1/096716 |
| 9,349,288 | B2* | 5/2016 | Raamot | G08G 1/08 |
| 9,501,929 | B2* | 11/2016 | Sugawara | G08G 1/0962 |
| 2005/0125115 | A1* | 6/2005 | Hiwatashi | G01C 21/26 701/25 |
| 2007/0008176 | A1 | 1/2007 | Sirota et al. | |
| 2008/0300776 | A1* | 12/2008 | Petrisor | G08G 1/0112 701/118 |
| 2009/0231161 | A1* | 9/2009 | Malarky | G07B 15/063 340/933 |
| 2013/0110316 | A1 | 5/2013 | Ogawa | |
| 2014/0118553 | A1 | 5/2014 | Diba | |
| 2015/0070195 | A1 | 3/2015 | Gaines et al. | |
| 2016/0035223 | A1* | 2/2016 | Gutmann | B60W 30/09 340/907 |
| 2016/0148511 | A1* | 5/2016 | Shibata | G08G 1/162 701/119 |
| 2016/0225201 | A1* | 8/2016 | Hiroki | B60W 50/0097 |
| 2016/0293006 | A1* | 10/2016 | Bauer | G08G 1/095 |
| 2016/0328963 | A1* | 11/2016 | Yao | G08G 1/0112 |
| 2017/0160743 | A1* | 6/2017 | Schweikl | G05D 1/0088 |
| 2017/0178506 | A1* | 6/2017 | Witte | G08G 1/096 |
| 2017/0178508 | A1* | 6/2017 | Chiu | G08G 1/096725 |
| 2017/0225687 | A1* | 8/2017 | Pu | B60W 40/04 |
| 2017/0329328 | A1* | 11/2017 | Horita | G05D 1/0061 |
| 2017/0330055 | A1* | 11/2017 | Iwasaki | G06K 9/6262 |
| 2017/0345312 | A1* | 11/2017 | Shimizu | G08G 1/167 |

OTHER PUBLICATIONS

Hans-Werne Schaal et al., "Car2x—From Research to Product Development", Technical Article, Vector, Dec. 2012, 6 pages.
"SAE J2735 Standard: Applying the Systems Engineering Process", Final Report—Jan. 2013, U.S. Department of Transportation, 22 pages.
Chih-Chung Chang et al., "LIBSVM: A Library for Support Vector Machines", retrieved from http://www.csie.ntu.edu.tw/-cjlin/papers/libsvm.pdf., Mar. 4, 2013, 39 pages.

* cited by examiner

MONITORING OF A TRAFFIC SYSTEM

CROSS-REFERENCE TO RELATED APPLICATIONS

This application claims priority under 35 U.S.C. § 119(a), to European Patent Application No. 15186008.7, filed on Sep. 21, 2015, the entire contents of which are incorporated herein.

TECHNICAL FIELD

This description generally relates in general to traffic control systems.

BACKGROUND

Traffic control systems can be used to control the traffic flow of vehicles and pedestrians primarily via respective traffic lights. Vehicles that are enabled to anticipate the light signals of traffic lights can adjust their driving behavior to save energy or fuel consumption. Some mechanisms are known for retrieving information about traffic light status of traffic control systems and switching cycles in any geographical region (e.g., a city, a town, a district, or a country-side area). However, in order to access the information of traffic lights within a region, a connection to several traffic light infrastructure systems delivered by different technology providers may be needed.

SUMMARY

In one general aspect, a traffic control system can include a plurality of traffic lights. A computer-implemented method for monitoring the traffic control system can include receiving a stream of sensor data from a plurality of visual sensors, each visual sensor being configured to capture the light signals of the plurality of traffic lights, each traffic light being sensed by at least one of the visual sensors, and the received stream of sensor data being representative of a current signal status of each of the plurality of traffic lights, predicting at least one future signal status for at least one of the plurality of traffic lights based on use of a machine learning algorithm applied to data for a current signal status associated with the at least one of the plurality of traffic lights and data for a previously received signal status associated with the at least one of the plurality of traffic lights, the at least one future signal status including an expected point in time when the current signal status will switch to the at least one future signal status, and sending at least one message to a vehicle, the at least one message including the current signal status and the at least one future signal status of the at least one of the plurality of traffic lights, the sent at least one message configured to influence operation of the vehicle.

In further implementations, a computer program product having computer-readable instructions that when loaded into a memory of a monitoring system for a traffic control system and executed by at least one processor of the monitoring system can perform the steps of a respective computer implemented method for performing the above described functions of the monitoring system.

Example implementations outlined above and disclosed herein may include one or more of the following features. For instance, the received stream of sensor data can originate from at least one digital camera with a field of view including at least one of the traffic lights. The received stream of sensor data can originate from at least one photocell mounted on a respective traffic light included in the plurality of traffic lights, the at least one photocell configured to measure the light emitted by the respective traffic light. Receiving a stream of sensor data from a plurality of visual sensors can further include duplicating the stream of sensor data, and delaying the stream of sensor data or the duplicate stream of sensor data. Predicting at least one future signal status for at least one of the plurality of traffic lights can further include using the delayed stream of sensor data as a training stream for the machine learning algorithm, and using the non-delayed stream of sensor data for prediction of signal status changes. Receiving a stream of sensor data from a plurality of visual sensors can further include receiving another stream of sensor data from a plurality of other sensors, each of the other sensors being associated with a respective traffic light and including data for a traffic status for the associated respective traffic light, and data for the traffic status being an indicator for current traffic affected by the associated respective traffic light. Predicting at least one future signal status for at least one of the plurality of traffic lights can further include using the data for the traffic status in the machine learning algorithm for the prediction of the future signal status for the associated respective traffic light.

In another general aspect, a traffic control system can include a plurality of traffic lights. A monitoring system for the traffic control system can include an inbound interface component, an analytics component, and an outbound status provisioning component. The inbound interface component can be configured to receive a stream of sensor data from a plurality of visual sensors, each visual sensor being configured to capture light signals of the plurality of traffic lights, each traffic light being sensed by at least one of the visual sensors, and the received stream of sensor data being representative of a current signal status of each of the plurality of traffic lights. An analytics component can be configured to predict at least one future signal status for at least one of the plurality of traffic lights based on use of a machine learning algorithm applied to data for a current signal status associated with the at least one of the plurality of traffic lights and data for a previously received signal status associated with the at least one of the plurality of traffic lights, the at least one future signal status including an expected point in time when the current signal status will switch to the at least one future signal status. The outbound status provisioning component can be configured to send at least one message to a vehicle, the at least one message including the current signal status and the at least one future signal status of the at least one of the plurality of traffic lights, the sent at least one message configured to influence operation of the vehicle.

Example implementations outlined above and disclosed herein may include one or more of the following features. For instance, the plurality of visual sensors can include at least one digital camera with a field of view including at least one of the plurality of traffic lights. The plurality of visual sensors can include at least one photocell mounted on a respective traffic light included in the plurality of traffic lights, the at least one photocell configured to measure light emitted by the respective traffic light. The visual sensor can be associated with a lane specific traffic light. The at least one message sent to the vehicle can include data relevant for a Signal Phase and Timing (SPaT) application executed by the vehicle. The at least one message sent to the vehicle can include data relevant for a Road Topology (MAP) application executed by the vehicle. The inbound interface component can be configured to duplicate the stream of sensor data, and delay the stream of sensor data or delay the duplicate stream of sensor data. The analytics component can be configured to use the delayed stream of sensor data as a training stream for the machine learning algorithm, and use the non-delayed stream of sensor data for prediction of signal status changes. The inbound interface component can be configured to generate, from the received stream of sensor data, another stream of sensor data including signal status data at equidistant time intervals. Multiple consecutive time intervals included in the signal status data can form a data frame, the data frame being suitable as input data for the machine learning algorithm. The inbound interface component can be configured to receive another stream of sensor data from a plurality of other sensors, each of the other sensors being associated with a respective traffic light and including a traffic status for the associated respective traffic light, and the traffic status being an indicator for current traffic affected by the associated respective traffic light. The analytics component can be configured to receive the traffic status for the associated respective traffic light, and use the received traffic status in the machine learning algorithm for the prediction of the future signal status for the associated respective traffic light. The inbound interface component can be configured to receive, from a traffic management system, traffic light program data for at least one of the plurality of traffic lights, the traffic light program data including information about at least one program controlling light signal switching of the respective at least one of the plurality of traffic lights. The analytics component can be configured to use the received traffic light program data in the machine learning algorithm for the prediction of the future signal status of the respective at least one of the plurality of traffic lights. The at least one message can include lane specific status data configured to influence the operation of the vehicle in a respective lane.

Further aspects as described herein can be realized and attained by means of the elements and combinations particularly depicted in the appended claims. It is to be understood that both, the foregoing general description and the following detailed description are exemplary and explanatory only and are not restrictive of the invention as described.

BRIEF DESCRIPTION OF THE DRAWINGS

Like reference symbols in the various drawings indicate like elements.

DETAILED DESCRIPTION

Figure 1:
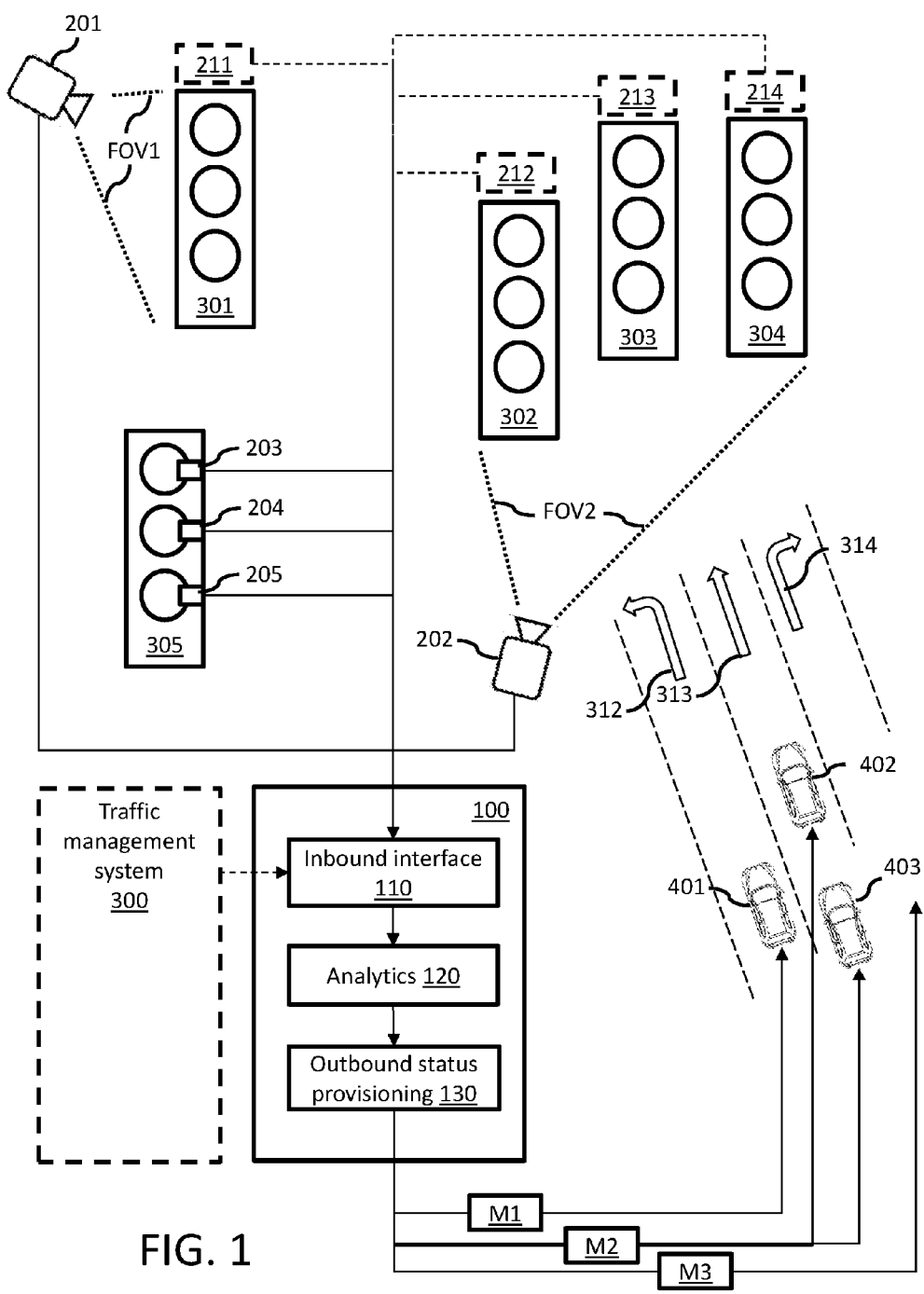
FIG. 1 is a diagram of an example traffic control scenario with a monitoring system for a traffic control system.

A typical traffic light infrastructure landscape includes systems from different providers and from different technological generations, with restricted or no compatibility between the systems. Current systems usually provide limited access to traffic light switching cycle data, requiring additional hardware and software add-ons. Data delivery latency times provided by legacy systems can be very high, rendering the available information from such legacy systems not useful for modern real-time applications such as vehicle powertrain optimizations and improved driver safety services. Current systems may only handle information of a limited amount of traffic lights simultaneously. Not all current traffic light systems provide support for Signal Phase and Timing (SPaT) and Road Topology (MAP) traffic data information formats, increasing the complexity of cross-systems integration due to lack of data homogenization. Systems taking advantage of traffic light switching cycle information may not be easily transportable and/or applicable to new locations and world regions.

Some camera systems which are mounted onboard of a vehicle can be used to analyze a traffic light status of a traffic light ahead and use the information guidance of the vehicle. Crowdsourced data originating from a plurality of vehicles are used to detect and predict the traffic signal schedule of traffic lights where actual traffic occurs. However, such predictions typically lack accuracy in that they cannot be assigned to particular lanes of the road.

It may be advantageous for a traffic control monitoring system to monitor the status of an entire traffic control system with an improved topological accuracy. For example, as described herein, a monitoring system for a traffic control system, a computer-implemented method for monitoring a traffic control system, and a computer program product which, when executed by the monitoring system, performs a monitoring method can be provided.

In some implementations, static visual sensors, such as for example cameras or photocells, can be used to detect the state or status of traffic lights belonging to the traffic control system. For example, it may be assumed that the status of a traffic light can be red [r], yellow [y], or green [g]. Of course, in a real scenario other states can occur. For example, a state [r/y] may occur before the status switches to [g]. There may be other states, such as for example, a blinking green light [g blinking]. Further, different colors or a different number of colors or different combinations thereof may be used to define states. The disclosed concepts can be applied to any number of states for a traffic light. Each state (status) of a traffic light has a clearly defined meaning to control traffic. Such status data are then consumed by the traffic control monitoring system.

The monitoring system can include an inbound interface module (component) to receive the status data from the visual sensors indicating the current status of the respective traffic light.

An analytics module (component) of the monitoring system makes use of machine learning algorithms to train a model for the signal phases of a traffic light. After the model has been trained, the module is able to predict signal states in the future.

An outbound information module (component) can publish the current status of traffic signals as well as predictions of future states. This data can be relevant for all types of SPaT/MAP Applications including Car2X scenarios, such as for example autonomous driving, and may also contain SPaT and MAP information. Car2X scenarios can include, but are not limited to, vehicle-to-vehicle communication and vehicle-to-infrastructure communication, where information can be exchanged between traffic participants and an infrastructure.

A traffic control system in the context of this document includes at least a plurality of traffic lights to control traffic in a defined geographic area (e.g., an entire city or a quartier). The traffic control system may further include components such as induction coils for vehicle detection in front of traffic lights or other sensors for traffic detection. It may also include further signs or actuators (e.g., railway crossing gates, etc.).

The inbound interface component receives a stream of sensor data from a plurality of statically mounted visual sensors. Each visual sensor is configured to capture light signals of at least one of the traffic lights and each traffic light is sensed by at least one of the visual sensors. The received sensor data include a current signal status of each traffic light, for example, [r], [y], or [g]. Examples for statically mounted visual sensors include a digital camera that is mounted with a field of view including at least one of the traffic lights or photocells mounted on a respective traffic light to measure light emitted by the respective traffic light. The visual sensors can either analyze the pictures or light signals of the traffic lights in a local computer vision system or forward the pictures or light signals to an external computer vision system to detect the current signal state of the respective traffic light. For example, such a computer vision system can extract the color information (e.g., red, yellow, green) and forward the result to a detection mechanism.

Using one or more image processing techniques, multiple traffic lights in one picture can be identified and the colors of each light can be retrieved in order to determine the overall status of each traffic light which is located in the field of view of the respective camera sensor. It may also be possible to associate the identified traffic lights in the image of a particular visual sensor with specific lanes for which are controlled by the respective traffic lights in multi-lane traffic situations. In contrast to mobile cameras, the static deployment of visual sensors can offer more accurate data since the position of the visual sensors is fixed. That is, a process to determine the geographical location of the visual sensor, as it is required in scenarios where mobile cameras are used, and the subsequent computation to identify the filmed traffic light may not be required.

A further advantage of using statically deployed visual sensors can be that, in cases where the traffic control system includes multiple signaling sub-systems (i.e., clusters of traffic lights which are jointly controlled) which have different technical properties (e.g., running on different communication protocols, having different capabilities in tracking the switching status of the various traffic lights in the sub-system, etc.), the detection of the signal status of each traffic light can be completely decoupled from the existing traffic control system infrastructure. As a consequence, the proposed solution can integrate any legacy traffic control system by just providing a common communication infrastructure for the visual sensors. For example, the sensor data can be submitted to the monitoring system by using communication infrastructures such as WiFi, Zigbee (e.g., IEEE 802.15.4 based communication), or other mobile/wireless and/or cabled communication solutions.

The analytics component can be configured to predict at least one future signal status for each traffic light of the plurality of traffic lights based on the use of a machine learning algorithm applied to current signal status data and previously received signal status data. The at least one future signal status can include the expected point in time when the current signal status will switch from the current to the future signal status.

The outbound status provisioning component can be configured to send at least one message to a vehicle wherein the at least one message includes the current signal status and the at least one future signal status of at least one traffic light. The sent message can be configured to influence the operation of the vehicle, which includes the ability to control the operation, by control signals/messages, without human interaction. For example, the sent message may include data relevant for a Signal Phase & Timing (SPaT) and/or Intersection Geometry and Topology (MAP) application to be executed by the vehicle. For example, MAP messages can convey the geometric layout of an associated intersection.

In some implementations, the inbound interface can be further configured to duplicate the received sensor data stream and to delay one of the two sensor data streams versus the other. In an alternative implementation, the delay function can be implemented in the analytics component. The analytics component may then use the delayed sensor data stream as a training stream for the machine learning algorithm, and the non-delayed data stream for online prediction of signal status changes.

In some implementations, the inbound interface can generate data frames of equal length from the received sensor data stream associated with one or more traffic lights of a signaling sub-system. This allows using the generated data frames as input for the machine learning algorithm. The length of a data frame has impact on the accuracy of the status prediction and on the time needed for training the prediction model. A reasonable frame length can be the cycle period of the signaling sub-system or a multiple thereof. The cycle period of the sub-system can be defined as the time interval it takes for a sub-system to arrive at the initial status again after the system has gone through a plurality of status changes.

In some implementations, the inbound interface can be configured to receive a further stream of sensor data from a plurality of statically mounted further sensors wherein each further sensor is associated with a respective traffic light and includes a traffic status for the respective traffic light. The traffic status is an indicator for the current traffic affected by the respective traffic light. For example, induction coils can be used to detect the presence of a vehicle in front of a traffic light. The detected signal can trigger the switching of the traffic light to the next status to improve the overall traffic flow. Another example is a request button associated with a traffic light for pedestrians which, when pushed by a pedestrian, indicates that a status switch is required for the respective traffic light. Further examples are pressure sensors, video cameras, etc. The analytics can use the received traffic status sensor data in the machine learning algorithm for the prediction of the future signal status of the respective associated traffic lights. The accuracy of the status prediction of traffic lights can be significantly improved when including traffic status sensor data in the machine learning algorithm.

In some implementations, the inbound interface may further receive traffic light program data for one or more traffic lights from a traffic management system. The traffic light program data includes information about programs controlling the signal switching of the respective one or more traffic lights. For example, the program ID of the program that is currently running to control the traffic light or the sub-system of traffic lights can be retrieved. Based on the program ID further program data may be retrieved, such as for example the current state of the program, the elapsed time since the program started, etc. In general, such further program data can include run-time data derived from the program in operation, such as data regarding the algorithm of the program as a sequence of typical traffic light switch patterns, including time between status changes. Such data can be available from traffic management systems that can be interfaced with the monitoring system to allow real-time program data retrieval. The analytics component can then use the received traffic light program data in the machine learning algorithm for the prediction of the future signal status of the respective one or more traffic lights which again may improve the accuracy of the traffic light status prediction results.

FIG. 1 is a diagram of an example traffic control scenario with a monitoring system 100 for a traffic control system. FIG. 1 is described in the context of the computer-implemented method for monitoring the traffic control system according to FIG. 2. Reference numbers referring to both figures are used in the following description.

The traffic control system in the example shown in FIG. 1 includes five traffic lights 301 to 305. Traffic control system as used throughout this disclosure can also refer to any sub-system of a large system. For example, a city may have a traffic control system which is managed by a traffic management system 300. Such a traffic management system can control the various programs running in the respective traffic lights. The traffic management system can be configured to receive data and information about a current status of the various programs running in the respective traffic lights. However, also sub-systems of the entire traffic control systems, such as for example the three traffic lights 302 to 304 which are used to control the traffic on three lanes 312 (turn left), 313 (straight), and 314 (turn right), are perceived as a traffic control system within the meaning of this application. Traffic light 302 affects the traffic on the turn left lane 312 (e.g., vehicle 401). Traffic light 303 affects the traffic on the straight lane 313 (e.g., vehicles 402, 403). Traffic light 304 affects the traffic on the turn right lane 314 (currently no traffic). The traffic lights 301 and 305 may control the traffic coming from other direction at a crossing, or they may relate to traffic lights for pedestrians to cross the street (with lanes 312, 313, 314), or they may be totally unrelated to the traffic lights 302 to 304.

Each traffic light in the respective traffic control system (which may include all traffic lights or just a sub-system of traffic lights) can be associated with a statically mounted (at a fixed location) visual sensor 201 to 205 that can capture the light signals emitted by the respective traffic lights. In the example, a digital camera sensor 202 is used which has a field of view FOV2 (illustrated by dotted lines) to capture the light signals of the traffic lights 302 to 304. Because of the static nature of the camera sensor 202, the camera sensor can be configured to receive data and information indicative of the light signal status of the respective traffic light affecting a particular lane.

Light signal status (or just status or state, as used throughout this application) can relate to the current combination of illuminated lights of a traffic light. One or more image processing techniques can be used to extract the light signal status of each of the three traffic lights. The camera sensor 202 may periodically sample the status of the three traffic lights. However, it may be advantageous to submit the status data to the monitoring system only when a status change of any one of the observed traffic lights actually is detected in order to save bandwidth in the communication with the monitoring system 100. In an alternative embodiment, the sensor 202 may provide the status data periodically to the monitoring system.

In some implementations, the monitoring system 100 can optionally be communicatively coupled with the traffic management system 300 (TMS 300). The TMS 300 may provide additional information regarding the overserved traffic lights to the monitoring system. For example, the TMS 300 can be configured to receive data and information indicative of the identifier of the current control program (program ID) which is currently running to control the switching of the traffic lights 302 to 304. The TMS 300 may be further configured to receive data and information indicative of the time which already elapsed since the start of the program or other useful information regarding the status of the traffic control system. However, the information of the TMS 300 can be optional and may not be always available for all traffic lights of the traffic control system. For example, legacy systems may not be equipped at all with such a TMS 300.

In the example shown in FIG. 1, a further statically mounted camera sensor 201 is available to capture the status of traffic light 301 in the respective field of view FOV1. Traffic light 305 is equipped with photocell sensors 203 to 205 which are used instead of a camera sensor. The photocells are attached to the traffic light so that each sensor can capture the status of one of the lights of traffic light 305. The status signals of all three sensors 203 to 205 provide the overall status of traffic light 305. In some implementations, multiple photocells per individual light may be used. For example, traffic lights for buses or trams sometimes use horizontal or vertical light bars as a sign for the drivers. In this case, two sensors per light are enough to identify the status of the individual light. The sensors can be mounted under 90 degrees so that one sensor capturers the horizontal and the other sensor captures the vertical light bar.

Some traffic lights may be associated with additional sensors providing information about the current traffic situation (traffic status). In the example shown in FIG. 1, traffic lights 301 to 304 are associated with such traffic status sensors 211 to 214. Examples for traffic status sensors can include road integrated induction coils to recognize the presence of a vehicle, pressure sensors which are able to determine the presence of a vehicle through its weight, camera sensors which can identify the presence of vehicles visually, request sensors which allow to request a signal change by, for example, pushing the request button (e.g., used by pedestrians) or using a remotely operable static reporting points/locations (e.g., used by bus drivers or tram drivers). The traffic status data can be collected by the TMS 300 and can be provided to the monitoring system 100 when appropriate.

The monitoring system 100 receives the current light signal status data of the traffic lights 301 to 305 from the visual sensors via an appropriate communication infrastructure. Optionally, it can also receive traffic status data and traffic light program data via the TMS 300. Thereby, the inbound interface component 110 receives a stream of sensor data from the visual sensors 201 to 205 and the received sensor data include a current signal status of each traffic light 301 to 305 (e.g., FIG. 2, block 1100).

Figure 2:
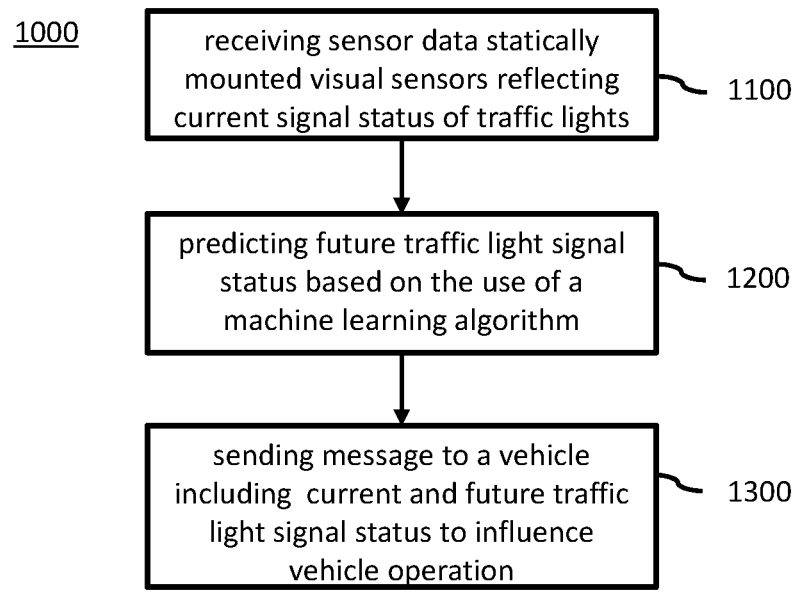
FIG. 2 is a flow chart for an example computer-implemented method for monitoring a traffic control system.

The analytics component 120 predicts at least one future light signal status for each traffic light based on the use of a machine learning algorithm applied to current signal status data and previously received signal status data (e.g., FIG. 2, block 1200). The at least one future signal status includes the expected point in time when the current signal status will switch from the current to the at least one future signal status. In other words, the future signal status as used herein is a value pair which includes the value of the expected future light signal and the point in time when the traffic light will switch to the future value. Optionally, the analytics component can also take into account traffic status data and program data provided through the TMS 300 to improve the accuracy of the prediction results.

The outbound status provisioning component 130 sends at least one message M1, M2, M3 to a respective vehicle 401, 402, 403 wherein the at least one message includes the current signal status and the at least one future signal status of at least one traffic light 302, 303, 304 (e.g., FIG. 2, block 1300). Thereby, the sent message is configured to influence the operation of the vehicle. The message includes lane specific status information. In other words, the message M1 relates to the turn left lane 312 and is therefore relevant for the vehicle 401. Messages M2 includes status information for the straight lane 313 and is therefore relevant for the vehicles 402, 403. The message M3 includes status information for the turn right lane 314. However, currently there is no data consumer available for this message.

For example, the monitoring system may send all messages M1, M2, M3 to all vehicles 401, 402, 403 approaching the traffic control system including the traffic lights 302, 303, 304. For example, the communication between the monitoring system 100 and the vehicles can make use of standard technologies like mobile communication networks and the Internet protocol. The messages include the traffic light phase prediction information relevant to selected vehicles. For example, a vehicle systems coordination component may determine which vehicles should receive the messages according to their location and heading. Each vehicle which is aware of its lane position can then extract the relevant message and act accordingly. For example, if the message indicates that the traffic light will switch from green to red in 6 seconds, the vehicles may automatically adjust their powertrain systems to the future situation. If a particular vehicle is able to reach the intersection under green light within allowed speed limits and traffic conditions, then the vehicle can adjust its speed to reach green light. If the vehicle is unlikely to reach the green light, the vehicle systems can notify the driver and prepare to slow down the vehicle speed and avoid crossing under red light while avoiding sudden and dangerous braking maneuvers. Such a Time To Green Scenario can build upon technology components enabling communication of traffic light state and intersection topology, and vehicles being equipped with the technology to receive that information. In addition, the aforementioned information has a positive effect on the driving behavior of the vehicle to reduce greenhouse gas emission.

Taking advantage of the signal phase information, drivers are notified about the remaining time before the signal changes, increasing driver's awareness of an upcoming traffic situation and preparedness to react accordingly. In autonomous car applications the TTG might be used to automatically start and stop the motor (engine) at the optimal point in time. Such start/stop automation may save fuel/energy by affecting the vehicle to automatically slow down early enough by reducing energy supply instead of late braking.

Figure 3:
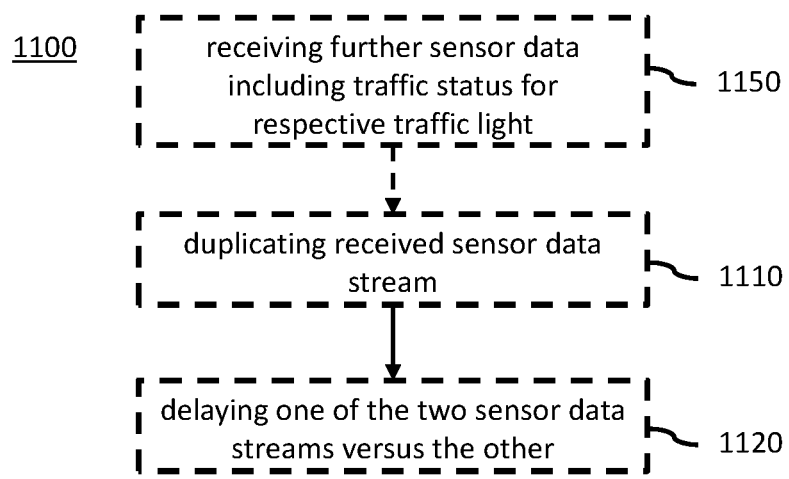
FIG. 3 illustrates details of some example method steps of the monitoring method shown in FIG. 2.
Figure 4:
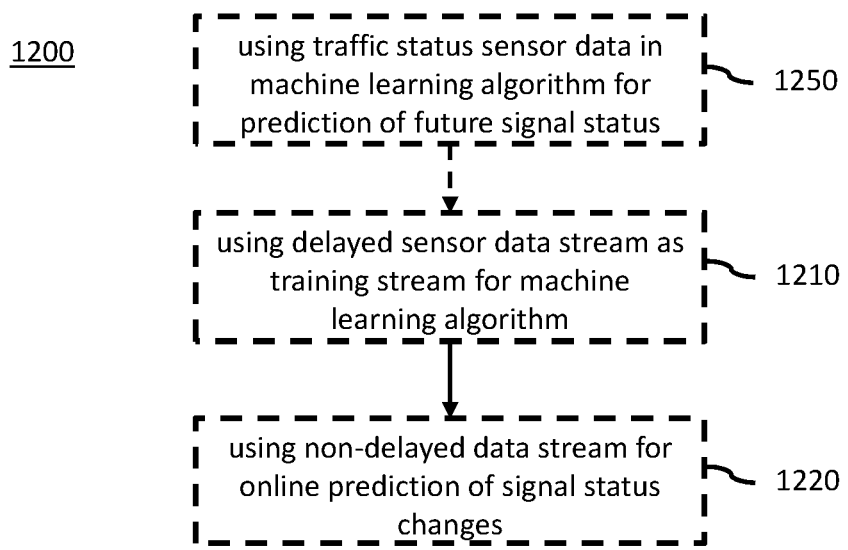
FIG. 4 illustrates additional details of some example method steps of the monitoring method shown in FIG. 2.

FIGS. 3 and 4, illustrate details of some method steps of the previously described monitoring method as shown and described with reference to FIG. 2. FIG. 3 illustrates example optional sub-steps of the receiving step (e.g., block 1100) which is performed by the inbound interface.

In a first implementation, the inbound interface may further receive a further stream of sensor data from a plurality of statically mounted further sensors (e.g., referring to FIG. 1, e.g., 211-215) (block 1150). Thereby, each further sensor is associated with a respective traffic light and includes a traffic status for the respective traffic light. The traffic status is an indicator for the current traffic affected by the respective traffic light. The communicative coupling between the further sensors and the monitoring system may be implemented as a direct communication or the traffic status data may be routed through the TMS.

Figure 8:
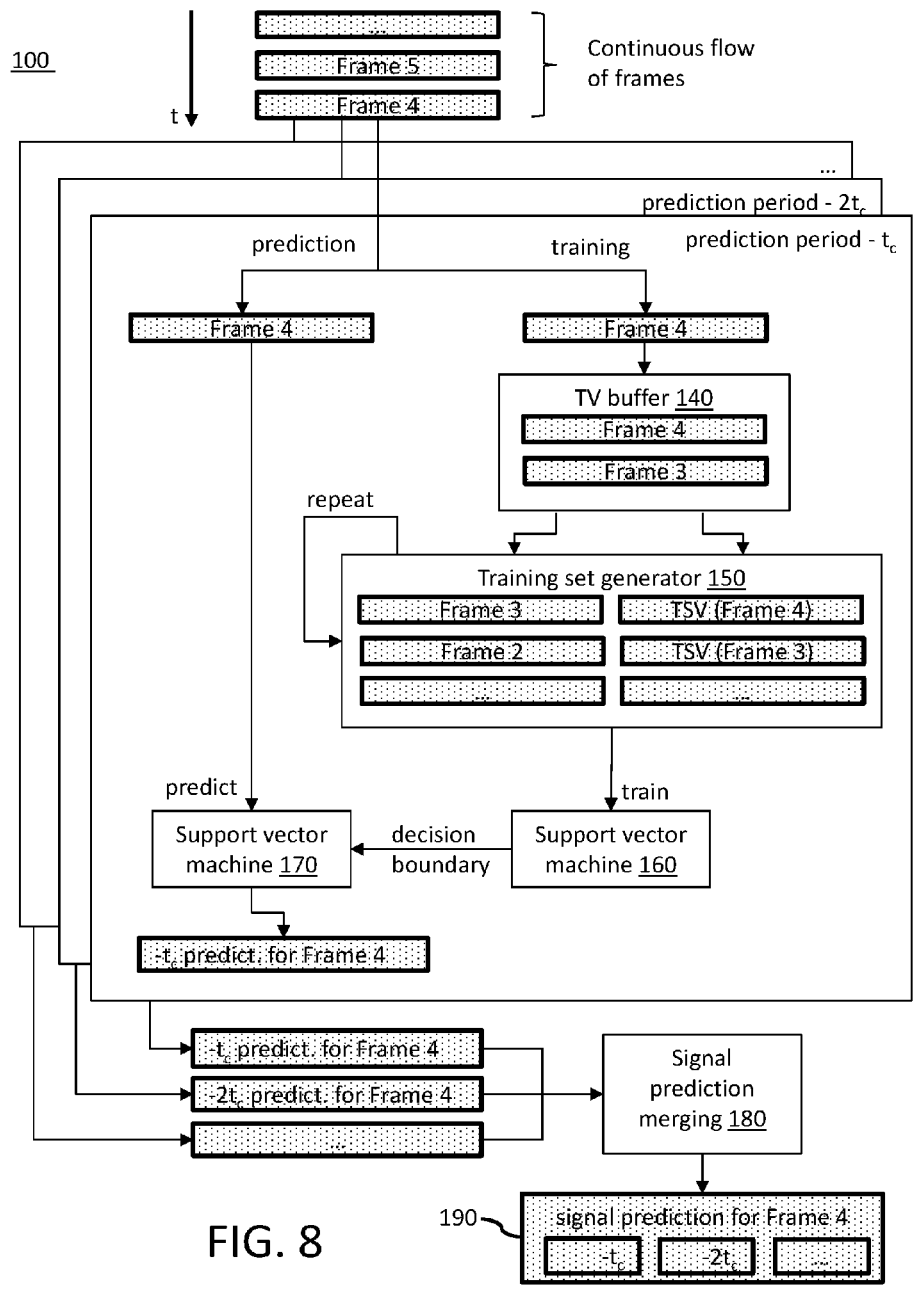
FIG. 8 illustrates example components of a monitoring system that implement a machine learning algorithm and perform light signal prediction.

In a second implementation, the inbound interface (or alternatively the analytics component) may duplicate the received sensor data stream (block 1110). Thereby, dependent on the particular implementation, the sensor data stream including the visual sensor data can be duplicated, or in case of also using further traffic status sensor data of the first implementation, such further data stream can also be duplicated. Then one of the two sensor data streams is delayed versus the other (block 1120). FIG. 8 illustrates an example of a detailed implementation of how this can be achieved. By duplicating and delaying the received data stream, based on the same data stream, an artificial time shift can be generated where the delayed data stream includes data (of the past) for which the future (i.e., the non-delayed data stream) is already known.

FIG. 4 illustrates optional sub-steps of the predicting step (block 1200) performed by the analytics component wherein the predicting sub-steps are complementary to the sub-steps of the receiving step. In some implementations, the analytics component may use the received traffic status sensor data in the machine learning algorithm for the prediction of the future signal status of the respective associated traffic lights (block 1250). This can improve the accuracy of the prediction because the further sensor data provide additional information about how the switching cycle of the traffic lights may be affected by external factors such as the current traffic status. In addition or in the alternative, the optional use of the program data for the respective traffic lights can be used to further improve the accuracy of the prediction results.

In some implementations, the analytics component may use the delayed sensor data stream as a training stream for the machine learning algorithm (block 1210), and may further use the non-delayed data stream for online prediction of signal status changes (block 1220). Again, it depends on the implementation used for the receiving step whether only the visual sensor data or also traffic status data and or program data are included in the delayed and non-delayed sensor streams. However, there may be a tradeoff between prediction accuracy and the time it takes to train the prediction model. The more sensor data that is included in the received data stream, the longer it can take to train the prediction model but the more accurate the prediction results will be.

Figure 5:
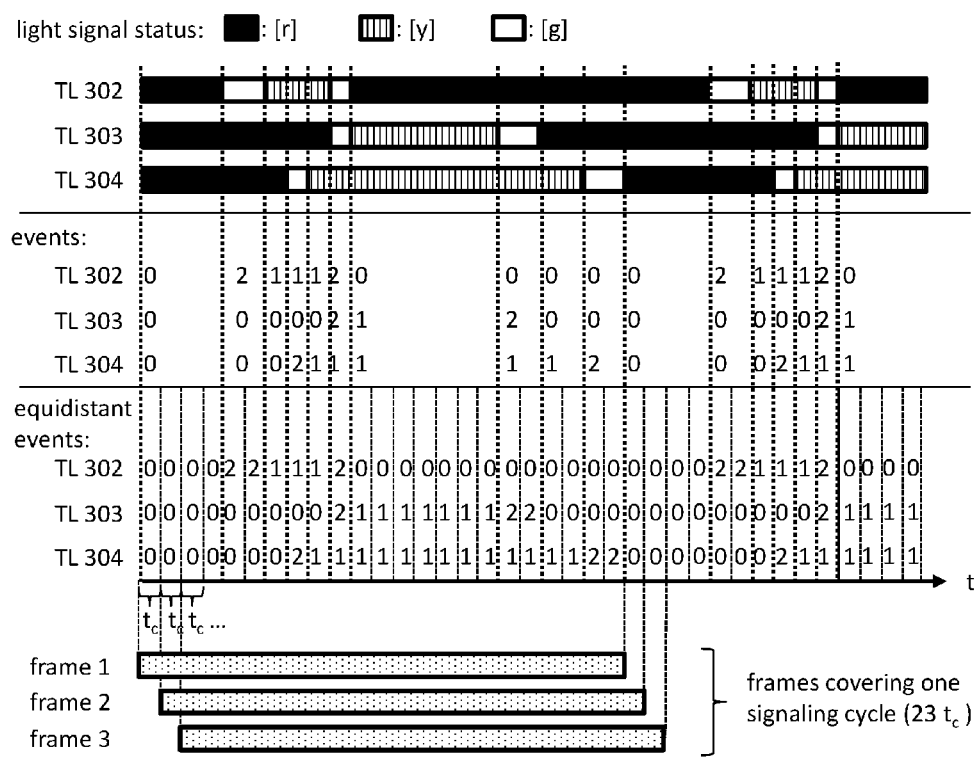
FIG. 5 illustrates example data frame generation for three traffic lights.

FIG. 5 illustrates example data frame generation for three traffic lights (TL) 302, 303, 304. For example, the machine learning algorithm can use data frames as input. A data frame corresponds to a sequence of status vectors including the characteristic signal switching behavior of a plurality of traffic lights. This sequence can include status vectors at a constant rate. However, the visual sensors can provide status updates of the lights signal status of the respective traffic lights only when the status changes. This is shown in the example of FIG. 5. At the top of FIG. 5 the legend for the light signal status is defined. In the example shown in FIG. 5, the traffic lights switch between three states: [r], [y] and [g]. The upper portion of the figure shows the switching cycles of the three traffic lights 302, 303, 304 over time, t. Each change of state is marked with a vertical dotted line.

The second portion of FIG. 5 (events) shows the status vectors associated with each switching event. Each status vector represents the current state of the traffic control system including TL 302, 303, 304 in this order. In the example shown in FIG. 5, the states [r], [y], [g] of each traffic light are represented by the numbers 0, 2, 1, respectively. The numbers representing the states may also be normalized. In this case the states [r], [y], [g] would be represented by the numbers 0, 1, 0.5, respectively. That is, the light signal data is normalized to the interval [0, 1]. It may be advantageous to normalize the data because all data values are within the same value range with similar properties (e.g., between zero and one, between negative 1 and one, or within other appropriate value ranges dependent on the machine learning algorithm).

In general, normalization of the data can facilitate the learning process for the computer. Assuming a first light signal sequence (A): [g]→[y]→[r], and a second light signal sequence (B): [r]→[y]→[g]. In a first normalization example, [r], [y], [g] can be mapped to (0, 0.5, 1). In a second normalization example, [r], [y], [g] can be mapped to (0, 2, 1). Both normalizations are valid but under certain circumstances, the first normalization may be advantageous. For the first normalization, the monitoring system computer can learn a linear function $f(t)=a+b*t$ for the signal sequences (A) and (B), with t being the time and a, b being degrees of freedom which are determined by the computer based on the training data. The linear property can be derived from the normalized data of the first normalization where the distance between the numerical values representing the light signal states is 0.5. For the example sequences, the data for (A) is (0<0.5<1) and the data for (B) is (1>0.5>0) and the first derivative of f(t) is constant. For the second normalization a non-linear function needs to be learned by the computer because for the sequences (A) with (0<2>1) and (B) with (1<2>0) the first derivative of f(t) is a function of t. The distance between zero and two further varies from the distance between two and one. That is, a linear function is not sufficient for the computer to learn the sequences (A), (B). Dependent on the machine learning algorithm the monitoring system computer may introduce additional degrees of freedom a, b, c which increases the complexity of the to-be-learned-function: $f(t)=a+b*t+c*t*t$. The degrees of freedom a, b, c are to be learned from the received data. In general, for such non-linear functions more data and more time may be required for the learning process than in the case of using a normalization with a linear function. As a consequence, the first normalization would be preferable over the second normalization because it facilitates signal sequence recognition for the monitoring system.

For visualization purposes, the non-normalized values are used in the example shown in FIG. 5. The initial state is that all three traffic lights are red. The corresponding status vector is (0, 0, 0). Then TL 302 changes to yellow. Thus, the corresponding (non-normalized) status vector is (2, 0, 0), and so on.

In case that the events are not equidistant, the machine learning algorithm may not be able to process the raw data as they come in. Therefore, the inbound interface may first perform an auto-completion step for the incoming data stream. The result of this step is shown in the third portion of FIG. 5 (equidistant events). The inbound interface determines a time interval $t_c$ which is used as the base interval for generating artificial events. The time interval $t_c$ should be at least as small as the smallest time interval between two real events in the event portion. As long as the overall status of the observed traffic control system does not change (i.e., the time interval between two real world switching events) the inbound component generates artificial events every time interval $t_c$ by replicating the current status vector. As a result, a series of equidistant events with corresponding status vectors is generated. Then, each data field of each frame may be normalized. Normalization can be achieved through mapping a status value onto the interval between zero and one. Light signal and other detector data values may already have values between zero and one. If the elapsed time after a program start is used (e.g., for improved prediction accuracy), the respective program time data field may also be normalized so that the program time data field values lie between zero and one.

Consecutive data frames can be defined as input data for the machine learning algorithm. The start event of a frame is the equidistant event that follows the start event of the previous frame. In the example shown in FIG. 5, the first three frames (frame 1, frame 2, and frame 3) are shown where the second frame is separated from the first frame by time interval $t_c$. Thereby, each data frame includes the same number of equidistant status vectors. In other words, each data frame has the same length. It may be advantageous to use a frame length that covers at least one switching cycle of the observed traffic control system. This may ensure an acceptable level of prediction accuracy. However, when additional accuracy relevant data can be taken into account in the status vectors, also smaller frame lengths may lead to acceptable prediction accuracy. In the example shown in FIG. 5, the switching cycle of the traffic control system includes 23 $t_c$ and the frame length is chosen accordingly.

In general, a frame with t=0 being the current time, event(t=0) representing the status vector of the traffic control system at the current time, and n being the number of equidistant time intervals $t_c$ defining the length of the frame, has the following structure:

frame:=[event($t$=0),event($t$=$t_c$), ... ,event($t$=($n$−1)$t_c$), event($t$=$nt_c$)]

Events at times with t>0 describe the status of the traffic control system in the past. Events at times t<0 describe future states of the traffic control system. The frames are then further processed by the analytics component having a training module and a prediction module.

Figure 6:
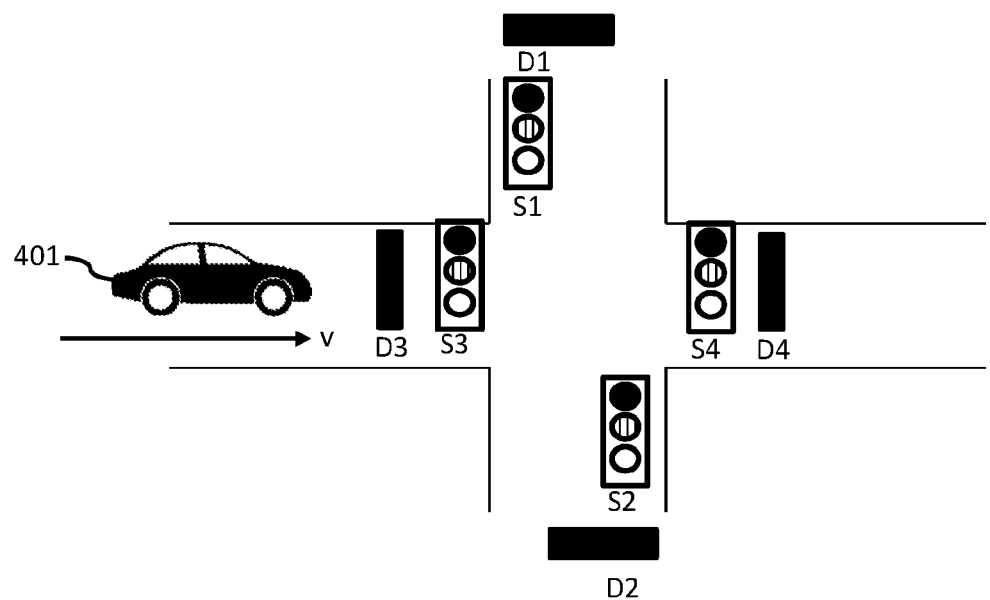
FIG. 6 is an example scenario for a traffic control system at a crossing with traffic lights and vehicle detectors.

FIG. 6 is an example scenario for a traffic control system at an intersection with four traffic lights S1 to S4 and four associated vehicle detectors D1 to D4. Typically, the vehicle detectors are induction coils that are worked into the road in front of a traffic light to detect whether a vehicle is already waiting in front of the traffic light. This may affect an earlier status change of the traffic light form red [r] to green [g] if compatible with the overall traffic situation. While the status is green [g], the detected signals of the detectors D1 to D4 can provide valuable information about the overall traffic situation. For example, the frequency of detector signals may indicate the density of the traffic. Other types of detectors (e.g., pressure detectors, video camera systems, etc.) can be used in alternative implementations to implement D1 to D4. In the example scenario shown in FIG. 6, a vehicle 401 is approaching traffic light S3 and its associated detector D3. The vehicle may go at speed v. However, the speed may vary over time and other vehicles may drive at a different speed.

The traffic lights S1 to S4 are monitored by respective visual statically mounted sensors as described with reference to FIG. 1. For example, such a visual sensor may be a device that is assembled with a camera, a small computer on-board, and a mobile communications transmitter, being able to capture a current traffic light status of a respective traffic light at the intersection. Each traffic light status can be capture by such a visual sensor. The camera(s) may use different approaches to determine the current traffic light status of one or multiple traffic signals. The may identify the current light signal state either by image processing or by light detection. Once the traffic light status has been determined for a respective traffic light, the traffic light status can be sent to the inbound interface component allowing the monitoring system to feed its prediction models.

Figure 7:
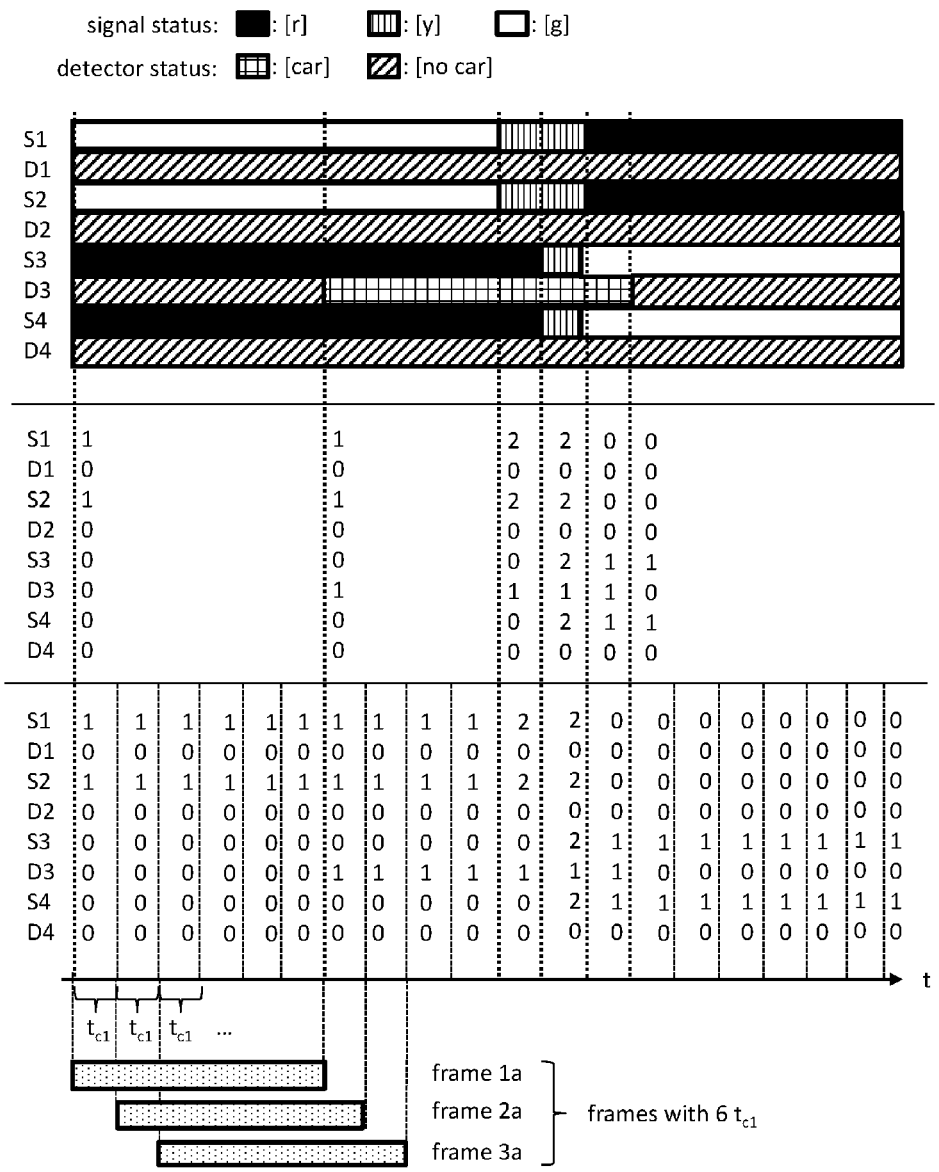
FIG. 7 illustrates data frame generation for an example scenario for a traffic control system.

FIG. 7 illustrates data frame generation for the example scenario described in FIG. 6. The methodology for the frame generation is similar to the scenario described in FIG. 5. However, in the example scenario of FIG. 7, the additional signals of the vehicle detectors D1 to D4 are part of the status vectors defining the events. In general, the proposed light signal prediction solution can cope with sequences of signals which are substantially periodical, and can further take into account signals which have more of an accidental character like detector signals detecting the presence of a vehicle.

Similar to FIG. 5, at the top of FIG. 7 is a legend that defines the visual representation for light signal status [r], [y], [g] of the traffic lights S1 to S4. In addition, the visual representation of the detector status [car], [no car] of the detectors D1 to D4 is defined where [car] stands for a situation where a vehicle is detected by the respective detector. Otherwise, the detector status is [no car]. In the example shown in FIG. 7, the traffic lights switch between three states: [r], [y] and [g]. The upper portion of the figure shows the switching cycles of the four traffic lights S1 to S4 over time t. Further, the upper portion includes the traffic status (e.g., detector status D1 to D4) of each detector. Each change of state is marked with a vertical dotted line. Thereby, the change of the traffic status of a particular detector can also be considered as a change of state of the traffic control system. In the example shown in FIG. 7 (e.g., referring to FIG. 6), the traffic status detected by D3 changes from [no car] to [car] when the vehicle 401 is located within the detection range of D3. It changes again to [no car] when the vehicle 401 leaves the detection range of D3. In the example shown in FIG. 7, the signal status of S3 is [r] when the vehicle 401 arrives and the detector status of D3 changes to [car]. Shortly after the status of traffic light S3 changes to [g], the vehicle 401 is passing the traffic light S3 and leaves the range of detection of D3. At his point in time the traffic status detected by D3 switches back to [no car].

The inbound interface may add further information like the traffic light program ID or the traffic light elapsed program time of the observed traffic light (if available via a TMS) to the received light signal status data for further prediction accuracy improvements. The TMS switches the traffic light program according to the traffic situation and/or time of day. When switching from one traffic light program to another the traffic light program ID changes. The machine learning algorithm detects the change and can select a corresponding prediction model for the changed program ID.

Similar to FIG. 5, the second portion of FIG. 7 shows the status vectors associated with each switching event including the detector events. Each status vector represents the current state of the traffic control system including pairs of light signal status and traffic status for each traffic light and its associated detector (S1, D1, S2, D2, S3, D3, S4, D4). In the example shown in FIG. 7, the states [r], [y], [g] of each traffic light are represented by the (non-normalized) numbers 0, 2, 1, respectively. The states [car], [no car] of each detector are represented by the numbers 1, 0, respectively. The initial status vector is (1, 0, 1, 0, 0, 0, 0, 0). Then D3 detects the vehicle 401 and the status vectors changes to (1, 0, 1, 0, 0, 1, 0, 0). The following status change events can be retrieved from the figure.

Again, the machine learning algorithm requires equidistant events as input. Therefore, the inbound interface may, similar as in FIG. 5, perform an auto-completion step for the incoming data stream where the detector data streams are included as well. The result of this step is shown in the third (equidistant events) portion of FIG. 7. The inbound interface determines a time interval $t_{c1}$ which is used as the base interval for generating artificial events. The time interval $t_{c1}$ should be at least as small as the smallest time interval between two real events in the event portion. The inbound component generates artificial events every time interval $t_{c1}$ by replicating the current status vector as long as the overall status of the observed traffic control system does not change. As a result, a series of equidistant events with corresponding status vectors is generated.

Finally, consecutive data frames are defined as input data for the machine learning algorithm. The start event of a frame is the equidistant event that follows the start event of the previous frame. In the example shown in FIG. 7, the first three frames (frame 1a, frame 2a, and frame 3a) are shown where the second frame is separated from the first frame by time interval $t_{c1}$. Thereby, each data frame includes the same number of equidistant status vectors. In the example shown in FIG. 7, the frame lengths are chosen as six $t_{c1}$. Although in this case the frame length is below the length of one switching cycle of the observed traffic control system it may still ensure an acceptable level of prediction accuracy because additional the traffic status data of the detectors D1 to D4 provide additional accuracy relevant data.

FIG. 8 illustrates example components of a monitoring system (e.g., the monitoring system 100) that may be used to implement a machine learning algorithm and to perform light signal prediction. The training and prediction of light signal states can be done while the monitoring system 100 is in operation (online) so that the prediction algorithm can adapt itself automatically to light signal program changes. The analytics component can be configured to compute light signal status predictions for different future points in time that are a multiple of the equidistant event time interval (e.g., $t_c$). For example, a prediction may be computed for a future prediction period $-t_c$, a future prediction period $-2t_c$, and so on. There may be no need to compute all possible prediction periods. For example, if only a prediction is required for the status of the traffic control system in exactly 30 seconds, then one prediction period may be computed which relates to prediction period $-(30/|t_c|)t_c$, where $|t_c|$ is the length of $t_c$ in seconds.

The inbound component receives a continuous flow of frames (Frame 4, Frame 5, . . . ) over time which can be generated as described in the context of FIG. 5 or FIG. 7. Further, the inbound interface (or the analytics component) may be configured to duplicate the received sensor data stream and to delay one of the two sensor data streams versus the other. One data stream can be used for online prediction, the other for training. In this implementation, for example, the training data stream is delayed by a time interval $t_{future}$ which is a multiple of $t_c$. $t_{future}$ corresponds to the time point for which the monitoring system is able to predict the future light signal status of the traffic control system. The current status of the traffic control system in the non-delayed data stream appears to be in the future from the perspective of the delayed data stream. The system can learn from the past and project the learnings into the future. In other words, from the perspective of the delayed data stream the analytics component is aware of all apparently future events up to $t_{future}$. Therefore, for the training data stream, the time when a light signal switches its color can be calculated deterministically. The trainings sample and its corresponding online prediction can be used to give feedback to the machine learning algorithm. The algorithm may use this feedback to increase prediction accuracy and may automatically adapt to programming changes in the traffic control system. This allows to also including dynamic changes which can be caused by traffic status sensor data as shown, for example, in FIG. 7.

For example, a buffer 140 can be used as a delay element. In an example implementation, the delayed data stream is used for training purposes of the machine learning algorithm. The training vector (TV) buffer 140 can be implemented as a FIFO (first in first out) memory structure component to buffer the respective training vectors in the order as they are received. In the example, the currently received frame is Frame 4. The earlier received frames which were already stored in the buffer 140 are Frame 2 and Frame 3. Frame 4 is buffered after the previously received Frame 3.

In other words, the TV buffer 140 can store the number of frames which may be required to allow the lowest number frame in the buffer (i.e., the frame which was received as the earliest frame of the buffered frames) to look at the current frame as a frame which occurs in the future at the intended prediction period. In the example, for the prediction period $-t_c$, buffer 140 only needs to store the current frame (Frame 4) and the previously received frame (Frame 3). For the prediction period $-2t_c$, buffer 140 needs to store the frames from Frame 4 to Frame 2, and so on. As a result, the training portion of the analytics component can improve later predictions by using the data stream of data frames which is delayed by $t_{future}$, so that the frame which is perceived by the training portion to be the current training frame is actually reflecting a status of the traffic control system in the past and can look at traffic light states from $-t_c$ to $-t_{future} t_c$. The monitoring system is thus enabled to determine the "future" states of the traffic light at times: $-t_c$, $2t_c$, ..., $-(t_{future}-1)t_c$, $-t_{future} t_c$.

The training set generator 150 can then associate the earlier received buffered frames with the light signal values of the future frame. In the example, Frame 3 is associated with a training signal vector TSV that includes the current light signal values of the traffic control system available in the current Frame 4. Earlier received Frame 2 was associated with its future training signal vector (TSV) of Frame 3, and so on. For the prediction period $-2t_c$ the training set generator 150 would associate the earlier received Frame 2 with the TSV of current Frame 4, and so on. That is, the training set generator in combination with the training vector buffer can associate any buffered earlier received frame with the TSV of the corresponding actual frame wherein the time interval between the earlier received frame and the current frame corresponds to the time interval for which a prediction value can be computed.

The described training approach can allow online and offline learning. The advantage of online learning (during operation of the traffic control system) is that changes to the traffic light program are automatically learned while it is running and do not need any manual human intervention. Further, there is no need for explicit information about the traffic light program itself because the information is implicitly available in the switching cycles of the traffic control system.

An online learning scenario can separate training and prediction, because training of a support vector machine is a computational expensive task, whereas the prediction calculated by a support vector machine is computational inexpensive. Online training is advantageous to keep prediction accuracy high over the long term because the real world traffic flow is changing over time caused by, for example, changes in the road network, behavior changes of drivers and changes in traffic light programs. Therefore, in the example, the training support vector machine (SVM) 160 trains a decision boundary which serves as input to the prediction support vector machine 170 so that the prediction support vector machine 170 uses the trained decision boundary to predict future signal states. In other words, SVM 160 trains, for each new training set, a new decision boundary so that changes in the traffic flow are represented in the boundary after some time which is then injected into the prediction support vector machine 170 so that its predictions consider the changes in the traffic flow.

For each time $[-t_c, -2t_c, \ldots, -(t_{future}-1)t_c, t_{future} t_c]$ a SVM is trained for each traffic light signal of the traffic control system. Each SVM is trained by using data frames and their corresponding future signal states as shown in FIG. 8. After training, a list of $t_{future}$ support vector machines is calculated for each traffic signal.

It may be possible to train the $t_{future}$ support vector machines for a single traffic light signal with probability estimates so that confidence scores are calculated for each support vector machine. This can allow more fine grained prediction because confidence levels for all $t_{future}$ states can be known and can be used within SPaT messages to provide accuracy information for predictions.

The support vector machine might use a radial basis function, or any other kernel function (e.g., linear, polynomial, Gaussian basis function).

The decision boundary is applied by the prediction support vector machine 170 to the current frame 4 providing the respective prediction result for the light signals of the traffic control system for the respective prediction period. In the example, the computation of the light signal prediction for Frame 4 for the prediction period $-t_c$, is shown in detail. The prediction for further prediction periods $-2t_c$, ... is computed accordingly.

The frames that are processed by the training module of the analytics component can also be consumed by the prediction sub-module. However, for prediction the non-delayed data stream is used to produce prediction frames. Each prediction frame is generated on a trained support vector machines to predict the signal state at times $[-t_c, -2t_c, \ldots, -(t_{future}-1)t_c, t_{-future} t_c]$. If probability estimates are also trained, a confidence level for each prediction is calculated. The prediction and the confidence level (if available) is forwarded to the outbound status provisioning component where the data is published to external systems or devices (e.g., vehicle control systems).

The monitoring system can be configured to compute predictions for a range of prediction periods. The various results can be merged by a signal prediction merging component 180 into a single data structure 190 including all signal predictions for Frame 4 for the whole range of prediction periods. The messages M1 to M3 in FIG. 1 may include such merged signal predictions.

Example scenario Green Light Optimal Speed Advisory (GLOSA) are described herein.

Vehicles circulating in urban areas can be subject to frequent stops and changes of speed due to varying traffic conditions and traffic lights regulating the vehicle movement across the city. As a result, a vehicle can consume more energy and has an increased wear in different subsystems such as breaks.

For example, many sudden speed variations can be avoided if the vehicle (or its driver) knows beforehand whether an upcoming traffic light signal could be reached or not, and at what speed the vehicle should circulate in order to minimize the number of stops.

In a GLOSA scenario, the current status of a traffic light is broadcasted to vehicles being within a predefined distance and approaching the traffic light (e.g., at an intersection). In addition or in the alternative, information about the intersection topology itself and the expected light phase schedule of each traffic signal (predicted light signal status) at the intersection can be broadcasted to the vehicles. The information in the corresponding sent messages may be sent in a SPaT and/or a MAP message format.

The vehicles approaching the intersection can receive this information and correlate it with the expected route in order to determine the optimal approximation speed. An optimal approximation speed can allow a vehicle to improve the energy efficiency and significantly reduce the number of unnecessary stops.

In a GLOSA scenario, the outbound status provisioning component can forward the status prediction results to a vehicle systems coordinator system.

The vehicle systems coordinator system can determine which vehicles should receive the predicted status information according to their location and heading and can forward the relevant traffic light phase prediction information to the identified vehicles. The vehicles receive the information and adjust their powertrain systems accordingly. If a particular vehicle is able to reach the traffic light of the intersection under green light within allowed speed limits and traffic conditions then the vehicle adjusts its speed to reach green light. If the vehicle is unlikely to reach the green light, the vehicle systems may notify the driver and can prepare to slow down the vehicle speed to avoid crossing under red light. Further, this can avoid sudden and dangerous breaking maneuvers.

Figure 9:
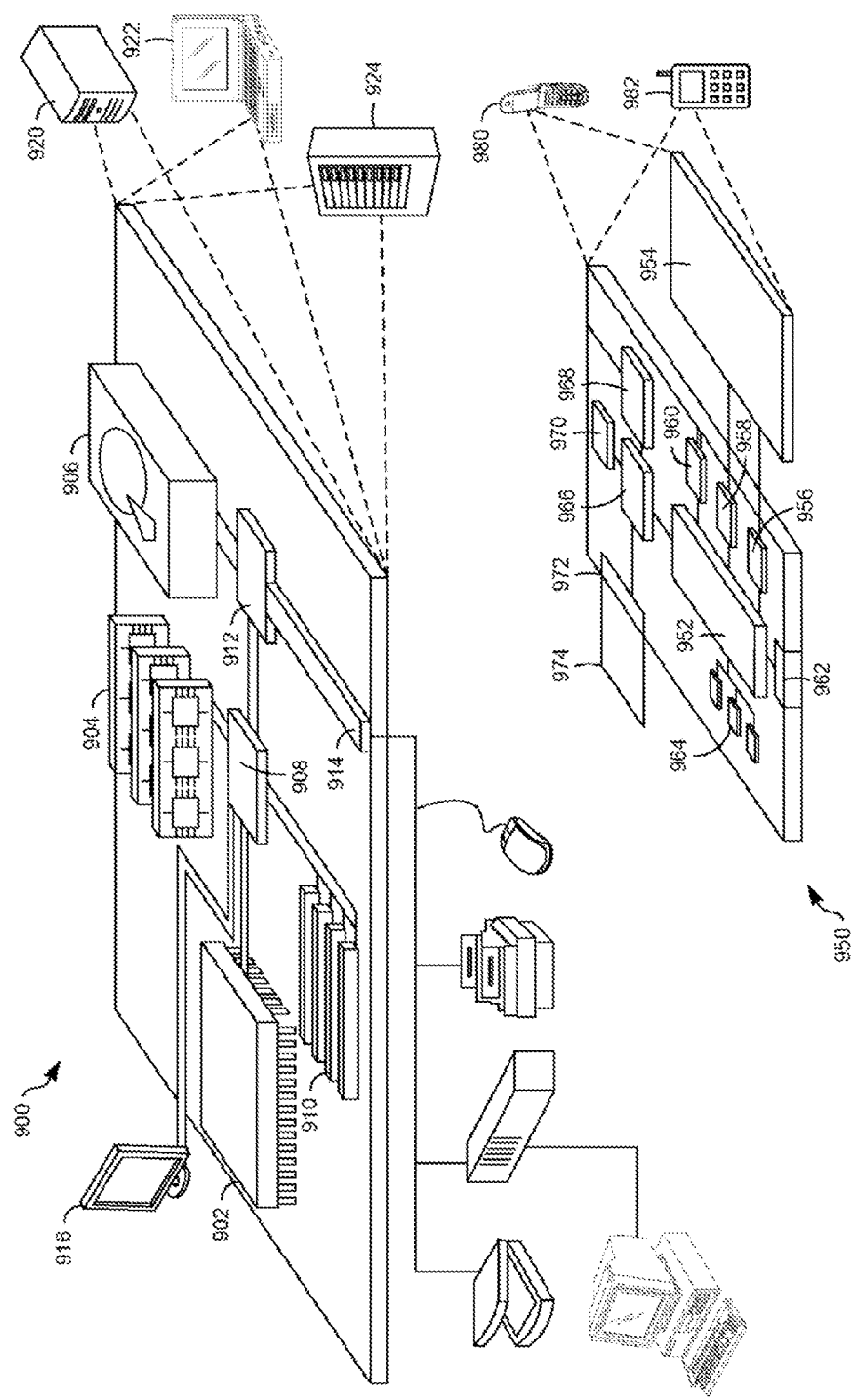
FIG. 9 is a diagram that shows an example of a generic computer device and a generic mobile computer device, which may be used with the techniques described here.

FIG. 9 is a diagram that shows an example of a generic computer device 900 and a generic mobile computer device 950, which may be used with the techniques described here. Computing device 900 is intended to represent various forms of digital computers, such as laptops, desktops, workstations, personal digital assistants, servers, blade servers, mainframes, and other appropriate computers. Generic computer device may 900 correspond to the computer system 100 of FIG. 1. Computing device 950 is intended to represent various forms of mobile devices, such as personal digital assistants, cellular telephones, smart phones, driving assistance systems or board computers of vehicles (e.g., vehicles 401, 402, 403, e.g., referring to FIG. 1) and other similar computing devices. For example, computing device 950 may include the data storage components and/or processing components of agent devices as shown in FIG. 1. The components shown here, their connections and relationships, and their functions, are meant to be exemplary only, and are not meant to limit implementations described and/or claimed herein.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 984 may also be provided and connected to device 950 through expansion interface 982, which may include, for example, a SIMM (Single In Line Memory Module) card interface. Such expansion memory 984 may provide extra storage space for device 950, or may also store applications or other information for device 950. Specifically, expansion memory 984 may include instructions to carry out or supplement the processes described above, and may include secure information also. Thus, for example, expansion memory 984 may act as a security module for device 950, and may be programmed with instructions that permit secure use of device 950. In addition, secure applications may be provided via the SIMM cards, along with additional information, such as placing the identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 984, or memory on processor 952 that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 980 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smart phone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing device that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing device can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the disclosure.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A monitoring system for a traffic control system, the traffic control system including a plurality of traffic lights, the monitoring system comprising:
    an inbound interface component configured to receive a stream of sensor data from a plurality of visual sensors, each visual sensor being configured to capture light signals of the plurality of traffic lights, each traffic light being sensed by at least one of the visual sensors, and the received stream of sensor data being representative of a current signal status of each of the plurality of traffic lights;
    an analytics component configured to predict at least one future signal status for at least one of the plurality of traffic lights based on use of a machine learning algorithm applied to data for a current signal status associated with the at least one of the plurality of traffic lights and data for a previously received signal status associated with the at least one of the plurality of traffic lights, the at least one future signal status including an expected point in time when the current signal status will switch to the at least one future signal status; and
    an outbound status provisioning component configured to send at least one message to a vehicle, the at least one message including the current signal status and the at least one future signal status of the predicted at least one of the plurality of traffic lights, the sent at least one message configured to influence operation of the vehicle.

2. The monitoring system of claim 1, wherein the plurality of visual sensors includes at least one digital camera with a field of view including at least one of the plurality of traffic lights.

3. The monitoring system of claim 1, wherein the plurality of visual sensors includes at least one photocell mounted on a respective traffic light included in the plurality of traffic lights, the at least one photocell configured to measure light emitted by the respective traffic light.

4. The monitoring system of claim 1, wherein the visual sensor is associated with a lane specific traffic light.

5. The monitoring system of claim 1, wherein the at least one message sent to the vehicle includes data relevant for at least one of a SPaT or a MAP application executed by the vehicle.

6. The monitoring system of claim 1,
    wherein the inbound interface component is further configured to:
        duplicate the stream of sensor data, and
        delay the stream of sensor data or the duplicate stream of sensor data; and
    wherein the analytics component is further configured to:
        use the delayed stream of sensor data as a training stream for the machine learning algorithm, and
        use the non-delayed stream of sensor data for prediction of signal status changes.

7. The monitoring system of claim 1,
    wherein the inbound interface component is further configured to generate, from the received stream of sensor data, another stream of sensor data including signal status data at equidistant time intervals, and
    wherein multiple consecutive time intervals included in the signal status data form a data frame, the data frame being suitable as input data for the machine learning algorithm.

8. The monitoring system of claim 1,
    wherein the inbound interface component is further configured to receive another stream of sensor data from a plurality of other sensors, each of the other sensors being associated with a respective traffic light and including a traffic status for the associated respective traffic light, and the traffic status being an indicator for current traffic affected by the associated respective traffic light; and
    wherein the analytics component is further configured to:
        receive the traffic status for the associated respective traffic light, and
        use the received traffic status in the machine learning algorithm for the prediction of the future signal status for the associated respective traffic light.

9. The monitoring system of claim 1,
    wherein the inbound interface component is further configured to receive, from a traffic management system, traffic light program data for at least one of the plurality of traffic lights, the traffic light program data including information about at least one program controlling light signal switching of the respective at least one of the plurality of traffic lights, and
    wherein the analytics component is further configured to use the received traffic light program data in the machine learning algorithm for the prediction of the future signal status of the respective at least one of the plurality of traffic lights.

10. A computer-implemented method for monitoring a traffic control system, the traffic control system including a plurality of traffic lights, the method comprising:

receiving a stream of sensor data from a plurality of visual sensors, each visual sensor being configured to capture light signals of the plurality of traffic lights, each traffic light being sensed by at least one of the visual sensors, and the received stream of sensor data being representative of a current signal status of each of the plurality of traffic lights;

predicting at least one future signal status for at least one of the plurality of traffic lights based on use of a machine learning algorithm applied to data for a current signal status associated with the at least one of the plurality of traffic lights and data for a previously received signal status associated with the at least one of the plurality of traffic lights, the at least one future signal status including an expected point in time when the current signal status will switch to the at least one future signal status; and sending at least one message to a vehicle, the at least one message including the current signal status and the predicted at least one future signal status of the at least one of the plurality of traffic lights, the sent at least one message configured to influence operation of the vehicle.

11. The method of claim 10, wherein the received stream of sensor data originates from at least one digital camera with a field of view including at least one of the traffic lights.

12. The method of claim 10, wherein the received stream of sensor data originates from at least one photocell mounted on a respective traffic light included in the plurality of traffic lights, the at least one photocell configured to measure the light emitted by the respective traffic light.

13. The method of claim 10, wherein the at least one message includes lane specific status data configured to influence the operation of the vehicle in a respective lane.

14. The method of claim 10,
wherein receiving a stream of sensor data from a plurality of visual sensors further includes:
duplicating the stream of sensor data; and
delaying the stream of sensor data or the duplicate stream of sensor data; and
wherein predicting at least one future signal status for at least one of the plurality of traffic lights further includes:
using the delayed stream of sensor data as a training stream for the machine learning algorithm, and
using the non-delayed stream of sensor data for prediction of signal status changes.

15. The method of claim 10,
wherein receiving a stream of sensor data from a plurality of visual sensors further includes receiving another stream of sensor data from a plurality of other sensors, each of the other sensors being associated with a respective traffic light and including data for a traffic status for the associated respective traffic light, and data for the traffic status being an indicator for current traffic affected by the associated respective traffic light; and
wherein predicting at least one future signal status for at least one of the plurality of traffic lights further includes using the data for the traffic status in the machine learning algorithm for the prediction of the future signal status for the associated respective traffic light.

16. A non-transitory computer program product having computer-readable instructions that when loaded into a memory of a monitoring system for a traffic control system and executed by at least one processor of the monitoring system performs the steps of:

receiving a stream of sensor data from a plurality of visual sensors, each visual sensor being configured to capture light signals of a plurality of traffic lights, each traffic light being sensed by at least one of the visual sensors, and the received stream of sensor data being representative of a current signal status of each of the plurality of traffic lights;

predicting at least one future signal status for at least one of the plurality of traffic lights based on use of a machine learning algorithm applied to data for a current signal status associated with the at least one of the plurality of traffic lights and data for a previously received signal status associated with the at least one of the plurality of traffic lights, the at least one future signal status including an expected point in time when the current signal status will switch to the at least one future signal status; and sending at least one message to a vehicle, the at least one message including the current signal status and the predicted at least one future signal status of the at least one of the plurality of traffic lights, the sent at least one message configured to influence operation of the vehicle.

17. The non-transitory computer program product of claim 16, wherein the received stream of sensor data originates from at least one digital camera with a field of view including at least one of the traffic lights.

18. The non-transitory computer program product of claim 16, wherein the received stream of sensor data originates from at least one photocell mounted on a respective traffic light included in the plurality of traffic lights, the at least one photocell configured to measure the light emitted by the respective traffic light.

19. The non-transitory computer program product of claim 16, comprising further instructions to perform the steps of:
duplicating the stream of sensor data; and
delaying the stream of sensor data or the duplicate stream of sensor data; and
wherein predicting at least one future signal status for at least one of the plurality of traffic lights further includes:
using the delayed stream of sensor data as a training stream for the machine learning algorithm, and
using the non-delayed stream of sensor data for prediction of signal status changes.

20. The non-transitory computer program product of claim 16,
wherein receiving a stream of sensor data from a plurality of visual sensors further includes receiving another stream of sensor data from a plurality of other sensors, each of the other sensors being associated with a respective traffic light and including data for a traffic status for the associated respective traffic light, and the data for the traffic status being an indicator for current traffic affected by the associated respective traffic light; and
wherein predicting at least one future signal status for at least one of the plurality of traffic lights further includes using the data for the traffic status in the machine learning algorithm for the prediction of the future signal status for the associated respective traffic light.

* * * * *